(12) United States Patent
McDonald et al.

(10) Patent No.: US 8,243,750 B2
(45) Date of Patent: Aug. 14, 2012

(54) METHOD OF CONTROL SIGNALING IN A WIRELESS COMMUNICATION SYSTEM

(75) Inventors: Daniel J. McDonald, Cary, IL (US); Harish Natarahjan, Steamwood, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 356 days.

(21) Appl. No.: 12/609,660

(22) Filed: Oct. 30, 2009

(65) Prior Publication Data

US 2011/0105168 A1  May 5, 2011

(51) Int. Cl.
*H04B 7/216* (2006.01)
*H04L 12/56* (2006.01)

(52) U.S. Cl. .................. 370/442; 370/252; 370/337

(58) Field of Classification Search .................. 370/252, 370/442, 337
See application file for complete search history.

(56) References Cited

U.S. PATENT DOCUMENTS 6,144,653 A * 11/2000 Persson et al. ................ 370/337
6,735,446 B1  5/2004 Iwata 2005/0070320 A1  3/2005 Dent
2006/0025125 A1  2/2006 Hong
2008/0232435 A1* 9/2008 Wilson .......................... 375/143

FOREIGN PATENT DOCUMENTS

WO  W09619906 A2  6/1996

OTHER PUBLICATIONS

PCT International Search Report for Counterpart Application Dated December 27, 2010.

* cited by examiner

*Primary Examiner* — John Pezzlo
(74) *Attorney, Agent, or Firm* — Randi L. Karpinia; Anthony P. Curtis; Daniel R. Bestor

(57) ABSTRACT

A method for Fixed Network Equipment (FNE) to control the three of four and one of four slow associated control channel (SACCH) pattern on an Association of Public-Safety Communications Officials (APCO) Project 25 (P25) trunked voice channel is provided. Knowledge of this pattern by both the FNE and radio allows for unique information to be signaled in each type of SACCH. According to some embodiments, an operation enables controlling the floor (inbound) while there is an independent outbound (floor) (e.g. Console takeover). The provided operation also allows each radio to differentiate inbound floor control signaling from outbound caller identification (ID). Having the infrastructure control the inbound SACCH pattern and communicate this to all radios, makes the correct detection of the transmitted pattern from the radio more reliable.

21 Claims, 9 Drawing Sheets

METHOD OF CONTROL SIGNALING IN A WIRELESS COMMUNICATION SYSTEM

FIELD OF THE DISCLOSURE

The present disclosure relates generally to wireless communication and more particularly a method for providing control signaling to a group of wireless communication devices engaged in a push-to-talk communication in a wireless communication system.

BACKGROUND

As public safety agencies evaluate their two-way radio needs for the future, many are reaching some similar conclusions: radio spectrum is becoming more congested and regulators are requiring public safety to do more with less, the demand for data transmission is more pronounced and often unachievable in narrow-band systems, systems need increased functionality, secure communication is a growing necessity, and improved digital voice quality is essential over more of the coverage area.

It will be appreciated that upgrading a communications network is a major undertaking in terms of time, energy and expense. A number of possible solutions are available, including the digital technologies that are now available.

The Association of Public-Safety Communications Officials (APCO) Project 25 (P25) is an industry-wide effort to set the recommended voluntary standards of uniform digital two-way radio technology for public safety organizations. For a copy of the APCO Project 25 Statement of Requirements, see http://www.apcointl.org/frequency/project25/documents/SOR-2008.pdf. Key objectives include providing enhanced functionality with equipment and capabilities focused on public safety needs, improving spectrum efficiency, ensuring competition among multiple vendors through Open Systems Architecture, and allowing effective, efficient, and reliable intra-agency and inter-agency communications.

One important aspect to any wireless communication standard is providing a mechanism for signaling control information to both receiving and transmitting radios. Within the APCO Project 25 standard, for example, control signaling controls such aspects as Caller Identification (ID) display on receiving radios, confirmation of the ability to transmit by the transmitting radio, and the ability for the Fixed Network Equipment (FNE) to determine the current transmitting radio on the channel.

Accordingly, it is desirable to accurately detect inbound control information. Further, there is a need for a reliable method for accurately determining when a transmitting radio is receiving outbound control signaling and also for accurately signaling caller ID and transmitter control information to the transmitting radios within a wireless communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
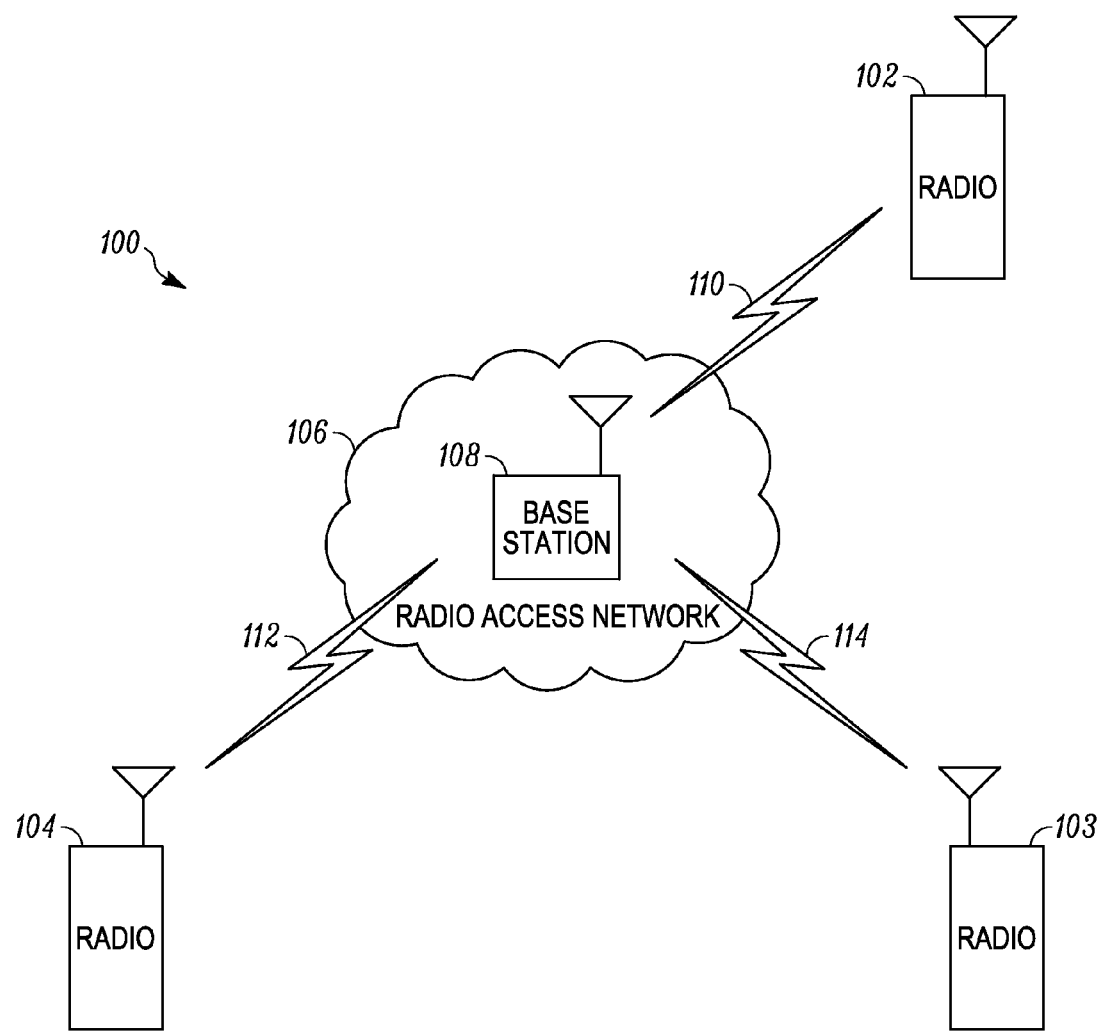
FIG. 1 illustrates a communication system in which various embodiments can be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments, the present invention includes a method for Fixed Network Equipment (FNE) to control the 3/4 and 1/4 slow associated control channel (SACCH) pattern on a P25 trunked voice channel. Knowledge of this pattern by both the FNE and the radio allows for unique information to be signaled in each type of SACCH. According to some embodiments, an operation enables controlling the floor (inbound) while there is an independent outbound (floor) (e.g. Console takeover). The provided operation also allows each radio to differentiate inbound floor control signaling from outbound caller identification (ID). Having the infrastructure control the inbound SACCH pattern and communicate this to all radios, makes the correct detection of the transmitted pattern from the radio more reliable.

FIG. 1 illustrates a wireless communication system 100 in which various embodiments of the present invention can be implemented. The wireless communication system 100 comprises a plurality of communications devices such as the illustrated radios 102, 103, and 104, which may be, for example, a portable or mobile radio, a personal digital assistant, a cellular telephone, a video terminal, a portable computer with a wireless modem, or any other wireless communication device. For purposes of the following discussions, the communication devices will be referred to as "radios" or "subscriber units", but they are also referred to in the art as mobile stations, mobile equipment, handsets, mobile subscribers, or an equivalent.

As illustrated, for example, the radios 102, 103, and 104 communicate over a radio access network 106. Those of ordinary skill in the art will appreciate that any type of wireless communication network is within the scope of the teachings herein. Thus, the radio access network 106 can comprise infrastructure such as, but not limited to, base stations (BS) (with a single BS 108 shown for clarity), BS controllers (not shown), network elements (such as, a mobile switching center, home location register, visitor location register, a trunking resource controller, a console operator position, etc.), and the like, to facilitate the communications between radios having access to the radio access network 106. It will be appreciated by those of ordinary skill in the art that other radio access networks (not shown) can also be connected to radio access network 106 to enable communication over wider areas spanned by multiple radio access networks.

For example, radio 102, 103, and radio 104 can communicate with each other through BS 108. As is known by one of ordinary skill in the art, BS 108 generally comprises one or more repeater devices that can receive a signal from a transmitting radio over one wireless link and re-transmit to listening radios over different wireless links. For example, radio 102 can transmit over link 110 to BS 108 and BS 108 can re-transmit the signal to listening radios 103 and 104 over wireless links 114 and 112, respectively. BS 108 can also receive a signal from radio 103 over wireless link 114 and re-transmit the signal to radios 102 and 104 over wireless links 110 and 112, respectively. Alternately, BS 108 can receive a signal from radio 104 over wireless link 112 and re-transmit the signal to radios 102 and 103 over wireless links 110 and 114, respectively. For ease of illustration, only three radios and one BS are shown. However, those skilled in the art will appreciate that, in a typical system, a radio network can include any number of radios, any number of Base Stations, any number of Base Controllers, and any number of network elements. Moreover, although in this embodiment communication between radios 102, 103, and 104 are illustrated as being facilitated by BS 108, radios 102, 103, and 104 can communicate using a direct mode of operation without a BS. The teachings herein are equally applicable to direct mode operation between two radios.

Since network 106 is a wireless network, meaning that it supports a wireless or air interface protocol for signal transmission, the radios 102, 103, and 104, and BS 108, comprise transceivers that include a transmitter and a receiver for transmitting and receiving radio frequency (RF) signals, respectively. Radios 102, 103, and 104, and BS 108, further comprise one or more processing devices (such as microprocessors, digital signal processors, customized processors, field programmable gate arrays (FPGAs), unique stored program instructions (including both software and firmware), state machines, and the like.) and typically a conventional memory element for performing (among other functionality) the air interface protocol and channel access scheme supported by network 106. Using these protocols, radios 102, 103, and 104 can each generate RF signals containing one or more data messages comprising a plurality of fields for organizing the continuous bits of information and/or signaling for transmission to another radio.

While one embodiment of a communication system 100 is described with regards to FIG. 1, those skilled in the art will appreciate that the specifics of this illustrative example are not specifics of the disclosure itself and that the teachings set forth herein are applicable in a variety of alternative settings. For example, since the teachings described do not depend on the type of air interface protocol or channel access scheme used (e.g., Time Division Multiple Access (TDMA), Code Division Multiple Access (CDMA), Frequency Division Multiple Access (FDMA), and the like), the teachings can be applied to any type of air interface protocol and channel access scheme. The teachings herein can also be applied with any system and with any protocol utilizing wireline links. As such, other alternative implementations using different types of wireline or wireless protocols and channel access schemes are contemplated and are within the scope of the various teachings describe.

The P25 Phase 2 Media Access Control (MAC) standard defines a Voice Channel (VCH) as a bi-directional channel, which is used to exchange voice and signaling blocks between the FNE and one or several subscriber units (SUs). A VCH may be associated with a group communication, a half duplex individual call, a half duplex telephone interconnect call, or a time division duplex individual call, including a telephone interconnect call. A VCH is composed of traffic (Voice+signaling) or fast associated control channel (FACCH) timeslots followed by a slow associated control channel (SACCH) signaling timeslot.

The P25 Phase 2 MAC standard defines a fast associated control channel (FACCH) as a signaling channel using slots normally assigned to voice on the voice channel (VCH). The FACCH is normally used for call establishment, hang-time, and teardown signaling.

Further, the P25 Phase 2 MAC standard defines a slow associated control channel (SACCH) as a periodic bi-directional logical channel on the VCH, which is used to exchange signaling or data information between the Fixed Network Equipment (FNE) and one or several Subscriber Units (SUs) assigned to the corresponding voice logical channel. An outbound SACCH is used to convey general broadcast information signaling to receiving radios such as call specific signaling, including call grants, and information regarding current channel users and current call type information about other active calls enabling radio scanning operation, paging signaling for moving individual users out of a call, and signaling to transmitting radios such as power control signaling and transmitter shutdown signaling. An Inbound SACCH is used to convey call specific signaling, including information regarding current channel users and current call type, call interrupt requests from listening radios, and call continuation requests during hang time. One SACCH per logical voice channel occur every twelve slots, which is commonly known as a superframe.

The location of a SACCH burst within a super frame is known to all receiving units. The SACCH burst carries SYNC on the inbound. The SACCH burst may be scrambled or un-scrambled. The Data Unit Identifier (DUID) is used to distinguish between the scrambled and un-scrambled SACCH.

SACCH signaling has a specific pattern (3 of 4 SACCH for signaling to receiving radio, 1 of 4 for outbound messaging to transmitting radio). The present invention provides for the FNE to control the 3 of 4 and 1 of 4 SACCH pattern. This information is signaled to radios, prior to and during the active call, to provide which specific SACCH positions are 3 of 4 and which are 1 of 4 (signaled in Inter-slot Signaling CHannel (ISCH)). This solution provides operations and processes that determine what individual identification (ID) information should be transmitted in the 3 of 4, 1 of 4 positions and how the radio should apply this information.

Outbound SACCH Signaling includes:
Random Access (RA) SACCH signaling—Transmitting radio control signaling (1 of 4 SACCH)—MAC_ACTIVE (Group Voice Channel User (GVCU)), MAC_RELEASE
Non-RA SACCH signaling—Overall Call Information SACCH signaling (3 of 4 SACCH)—This could be GVCU with call controller, Priority Monitor, Adjacent Status Broadcast Inbound SACCH Signaling (determined by F-bit (Rx'ers) and SACCH pattern (Tx'er) includes:
  RA SACCH signaling—Listening radio signaling
  Non-RA SACCH signaling—Transmitting radio signaling (GVCU)
Outbound ID Signaling includes:
  At non-transmitting radio's site, call controller ID in Non-RA SACCH, ID 0 in RA SACCH
  At transmitting radio's site, call controller ID in Non-RA SACCH, transmitting radio ID in RA SACCH The P25 Phase 2 MAC standard defines an ISCH as a logical channel that is located between two (2) consecutive outbound slots of a physical channel. It is sized to occupy the space reserved in the inbound path for ramping up and down, pilot sequences (at the beginning and at the end of the burst) and guard time. This logical ISCH is composed of 40 consecutive bits (comprised of the 20 bits at the end of an outbound slot and the 20 bits at the beginning of the next outbound slot).

There are two types of logical ISCHs. The first ISCH type, S-ISCH, contains a 40 bit synchronization sequence. The second ISCH type, I-ISCH, contains a 40 bit modulated information sequence that provides six information bits after decoding of the 40 bits at the MAC layer.

An Ultraframe is a set of four consecutive 360 millisecond (ms) superframes comprising a 1.44 second time interval. A superframe is a set of 2*6 timeslots of 30 ms each for two-slot TDMA, i.e. 360 ms. The last two timeslots are inverted signaling slots. Transmitting subscribers use the SACCH of the first three superframes in the ultraframe to send signaling information to the FNE and listen to information from the FNE in the outbound SACCH of the fourth superframe. The ultraframe structure is signaled in the I-ISCH field and it may optionally be determined, for example, by processing information within an APCO Project 25 SYNC_BCST message on the control channel.

In a fixed network equipment (FNE) controlled ultra frame, the FNE determines the specific location of a Random Access SACCH. The location of the SACCH slots can be determined in systems that synchronize the FDMA control channel and TDMA traffic channels, by the control channel Sync Broadcast message, and optionally in the I-ISCH. For systems that do not synchronize the FDMA control channel and TDMA traffic channels, the location of the SACCH can be determined in the I-ISCH. Availability of the inbound SACCH location is indicated in the I-ISCH preceding the specific inbound SACCH.

At a radio frequency (RF) Site with at least one transmitting radio, 1 of 4 inbound SACCH positions is available for random access. At a RF Site without a transmitting radio, 4 of 4 inbound SACCH positions are available for random access The receiving radio operation includes determining inbound SACCH availability from I-ISCH signaling (F-bit). Synchronized radios determine 1 of 4 Random Access SACCH pattern from Sync Broadcast message received on Control Channel. Unsynchronized radios determine 1 of 4 Random Access SACCH pattern from I-ISCHs.

Figure 2:
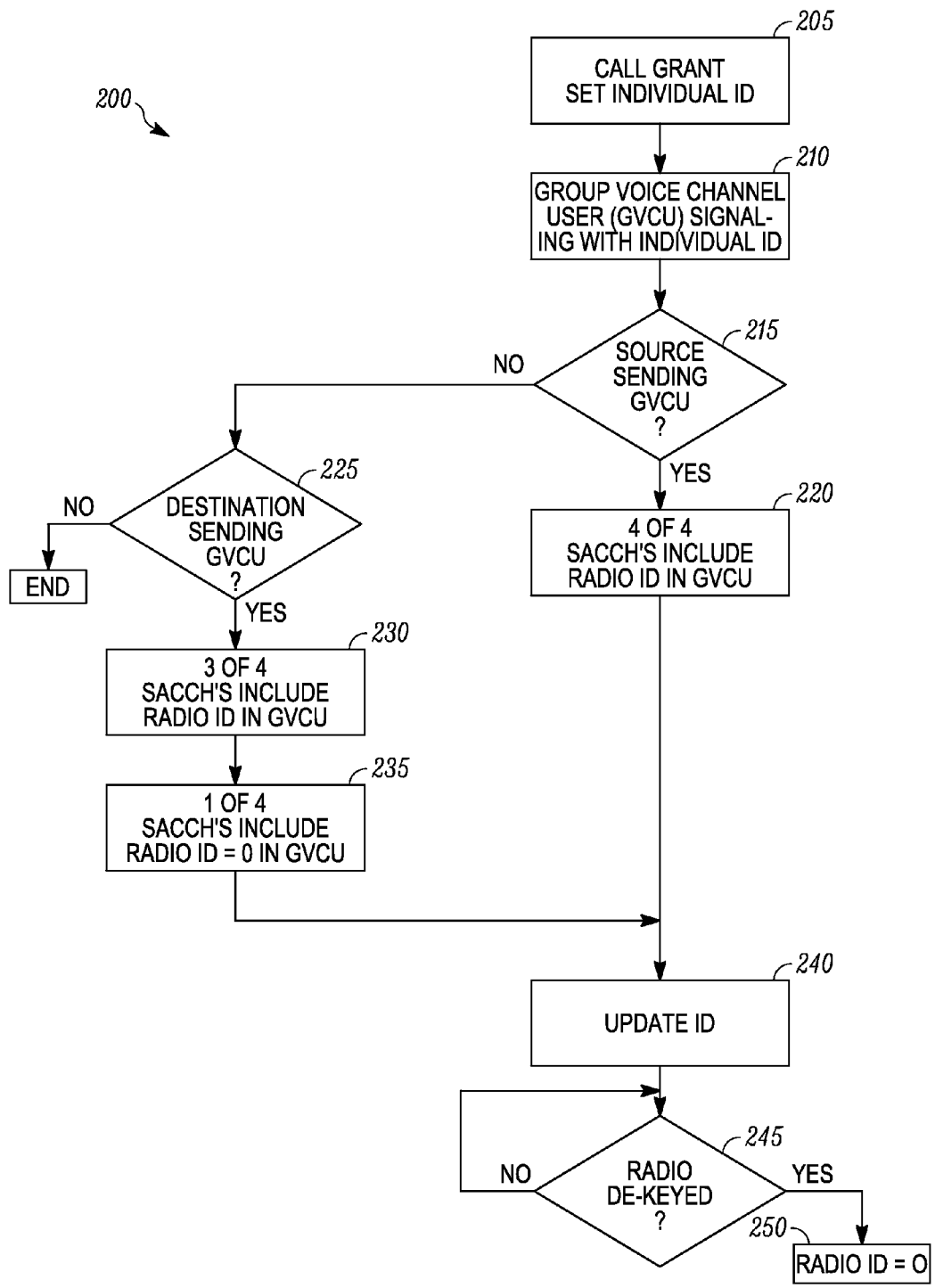
FIG. 2 is a flowchart illustrating a method of radio-initiated normal call operation in accordance with some embodiments

Basic ID control information for Receiving Radios includes:
  Non-RA SACCH—information used to update caller ID
  RA SACCH—information indicates presence of a transmitting radio on channel
Basic ID control information for Transmitting Radios includes:
  Non-RA SACCH—not accessible
  RA SACCH—information used to control ability to continue transmission
  If Group Voice Channel User (GVCU) in RA SACCH=transmitting radio ID, radio continues transmitting
  If ID in GVCU in RA SACCH <> transmitting radio ID, transmitting radio dekeys
  If ID in GVCU in RA SACCH=0, radio waits for next RA SACCH signaling
  If multiple consecutive RA SACCH ID=0, radio dekeys
  If multiple consecutive RA SACCH messages can not be validly decoded, radio dekeys
  If MAC_RELEASE message with radio ID is received, radio dekeys As briefly described previously herein, in accordance with some embodiments Individual Signaling in GVCU is provided herein. FIGS. 2 though 8 are flowcharts illustrating the operation of various devices within a wireless communication network in accordance with various embodiments.

Referring to FIG. 2 a radio-initiated normal call operation 200 is illustrated in accordance with some embodiments. As illustrated, the operation begins with Step 205 with a Call Grant in which an Individual ID is set. Next, in Step 210, the Individual ID from the Call Grant is initially used for GVCU signaling. Next, in Step 215, it is determined if a source site is sending a GVCU message in SACCH. When a source site is sending a GVCU message in SACCH, at the source site, 4 of 4 SACCHs include the radio ID in the GVCU in Step 220.

When a source site is not sending a GVCU message, the operation continues to Step 225 in which it is determined whether a destination site is sending a GVCU message in SACCH. When no destination site is sending a GVCU message, the operation ends. When a destination site is sending a GVCU message in SACCH, the operation continues to Step 230 in which 3 of 4 SACCHs include the radio ID in the GVCU in the SACCH. Next, in Step 235, 1 of 4 SACCHs includes an ID=0 in the GVCU in the SACCH.

Next, and after Step 220, in Step 240, the ID is updated based on received audio plane signaling from the transmitting radio. Next, in Step 245, it is periodically determined whether the radio is de-keyed. When the radio de-keys, the operation continues to Step 250 in which the transmitting radio ID is set to 0 at the transmitting radio site.

Figure 3:
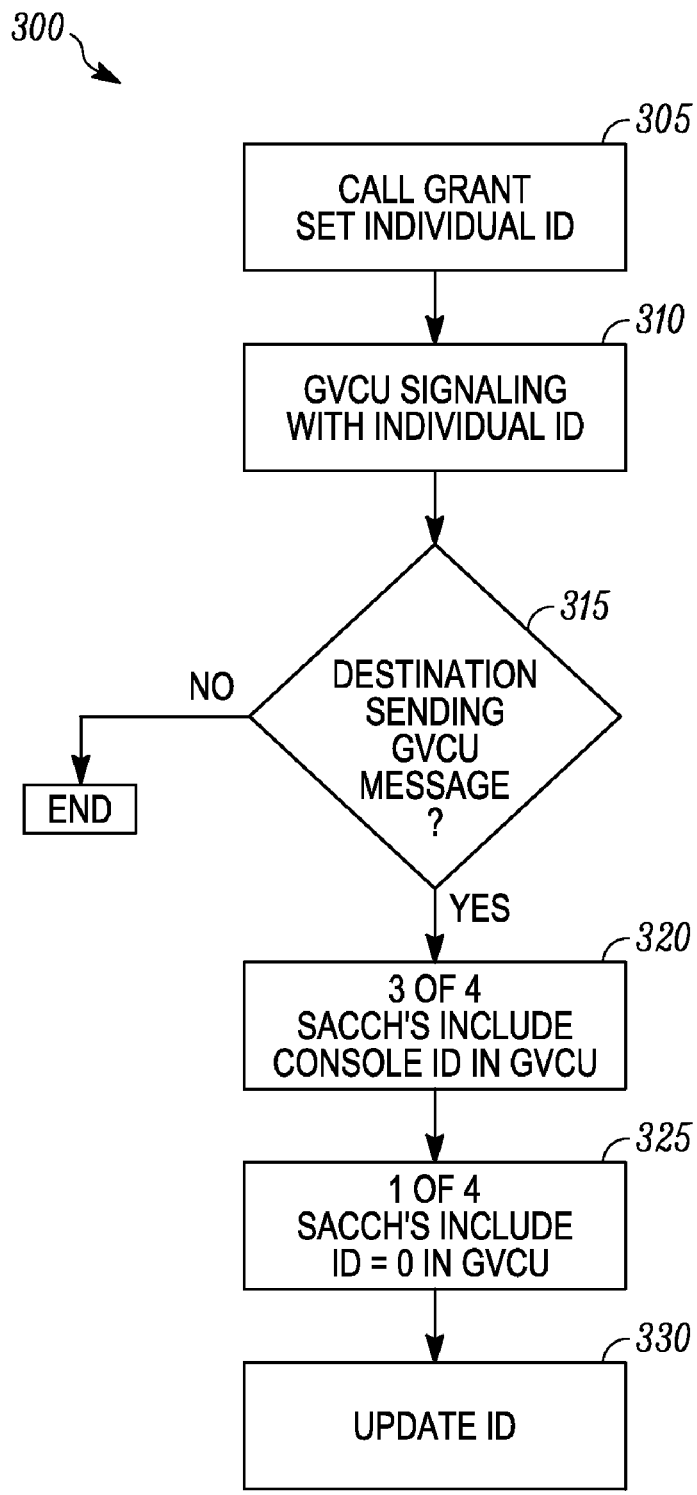
FIG. 3 is a flowchart illustrating a method of console-initiated normal call operation in accordance with some embodiments.

FIG. 3 is a flowchart illustrating a console initiated normal call operation 300 in accordance with some embodiments. As illustrated, the operation begins with Step 305 with a Call Grant in which an Individual ID is set. Next, in Step 310, the Individual ID from the Call Grant is initially used for GVCU signaling. Next, in Step 315, it is determined whether a destination site is sending a GVCU message in SACCH. When no destination site is sending a GVCU message, the operation ends. When a destination site is sending a GVCU message in SACCH, the operation continues to Step 320 in which 3 of 4 SACCHs include the radio ID in the GVCU in the SACCH. Next, in Step 325, 1 of 4 SACCHs includes an ID=0 in the GVCU in the SACCH. Next, in Step 330, the ID is updated based on received audio plane signaling from the transmitting console.

Figure 4:
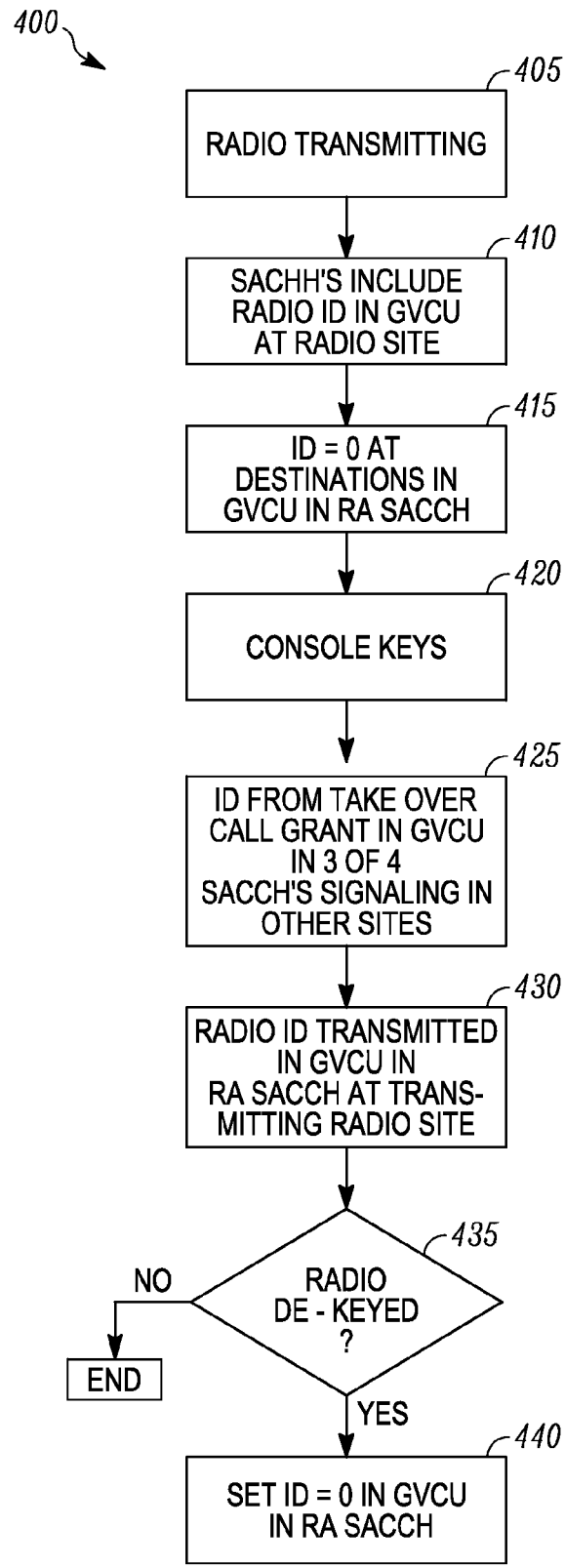
FIG. 4 is a flowchart illustrating a method of console takeover in accordance with some embodiments.

FIG. 4 is a flowchart illustrating an operation for console takeover 400 in accordance with some embodiments. As illustrated, the operation begins with a radio transmitting in Step 405. Next, in Step 410, all GVCUs in the SACCHs include the radio ID of the transmitting radio in GVCU messages at the transmitting radio site. In Step 415, the ID=0 at the destination sites in the GVCU in the random access (RA) SACCH. Next, in Step 420, the console keys and the take over call grant would indicate that the console was transmitting. Next, in Step 425, the ID from the take over call grant is used to populate each GVCU message in 3 of 4 SACCH signaling at each source and destination site. Next, in Step 430, the previously used radio ID continues to be transmitted in the in the GVCU in the RA SACCH at the transmitting radio site. (Note: ID=0 is used at destination sites). Next, in Step 435, it is determined whether the transmitting radio dekeyed during the console takeover. When the transmitting radio has not dekeyed, the operation ends. When the transmitting radio has dekeyed, the operation continues to Step 440 in which the previously transmitting radio site sets ID=0 in the GVCU in the RA SACCH.

Figure 5:
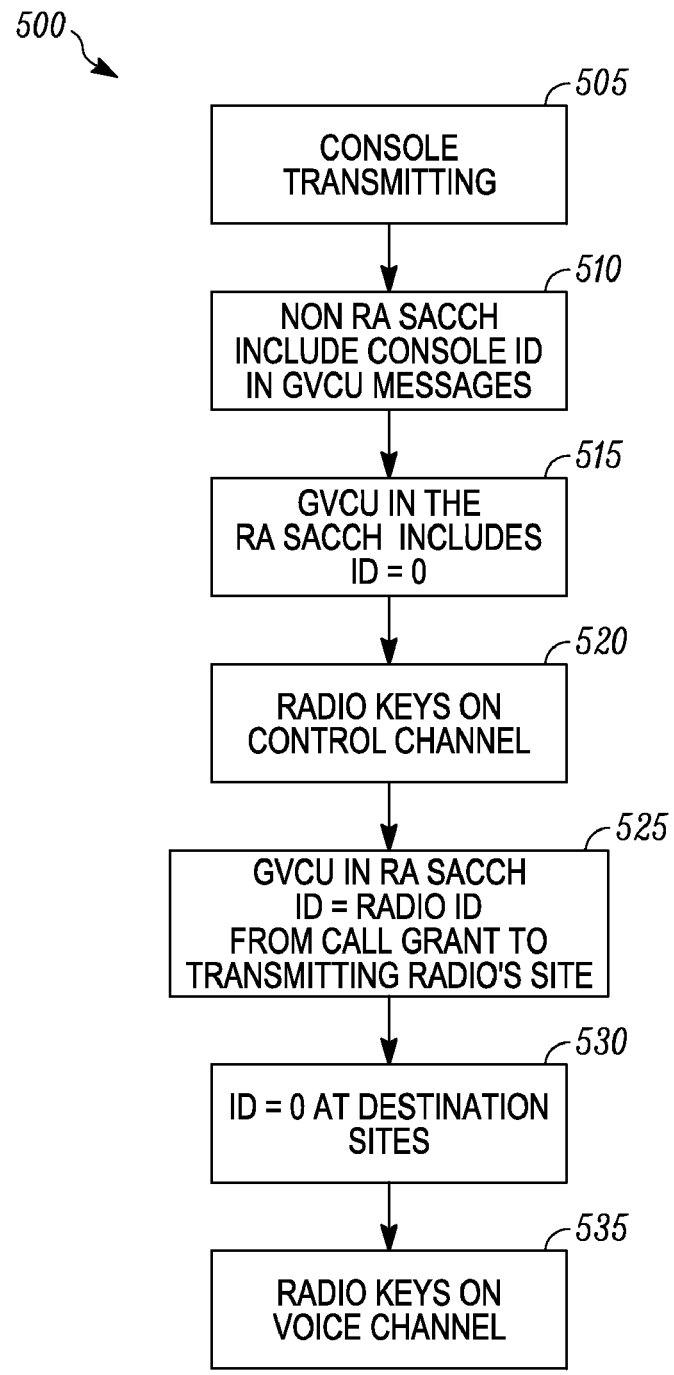
FIG. 5 is a flowchart illustrating a method of radio takeunder in accordance with some embodiments.

FIG. 5 is a flowchart illustrating an operation of radio take-under 500 in accordance with some embodiments. As illustrated, the operation begins in Step 505 in which a console is transmitting. Next, in Step 510, Non-RA SACCHs include the console ID in GVCU messages. Next, in Step 515, each RA SACCH includes ID=0 in the GVCU in the RA SACCH. Next, in Step 520, a radio keys on the control channel. In response, in step 525, each RA SACCH at the transmitting radio's site is updated with the radio ID in the GVCU in the RA SACCH as indicated in the call grant. In Step 530, ID=0 is used at the destination sites. Next, in Step 35, the radio keys on the voice channel.

Figure 6:
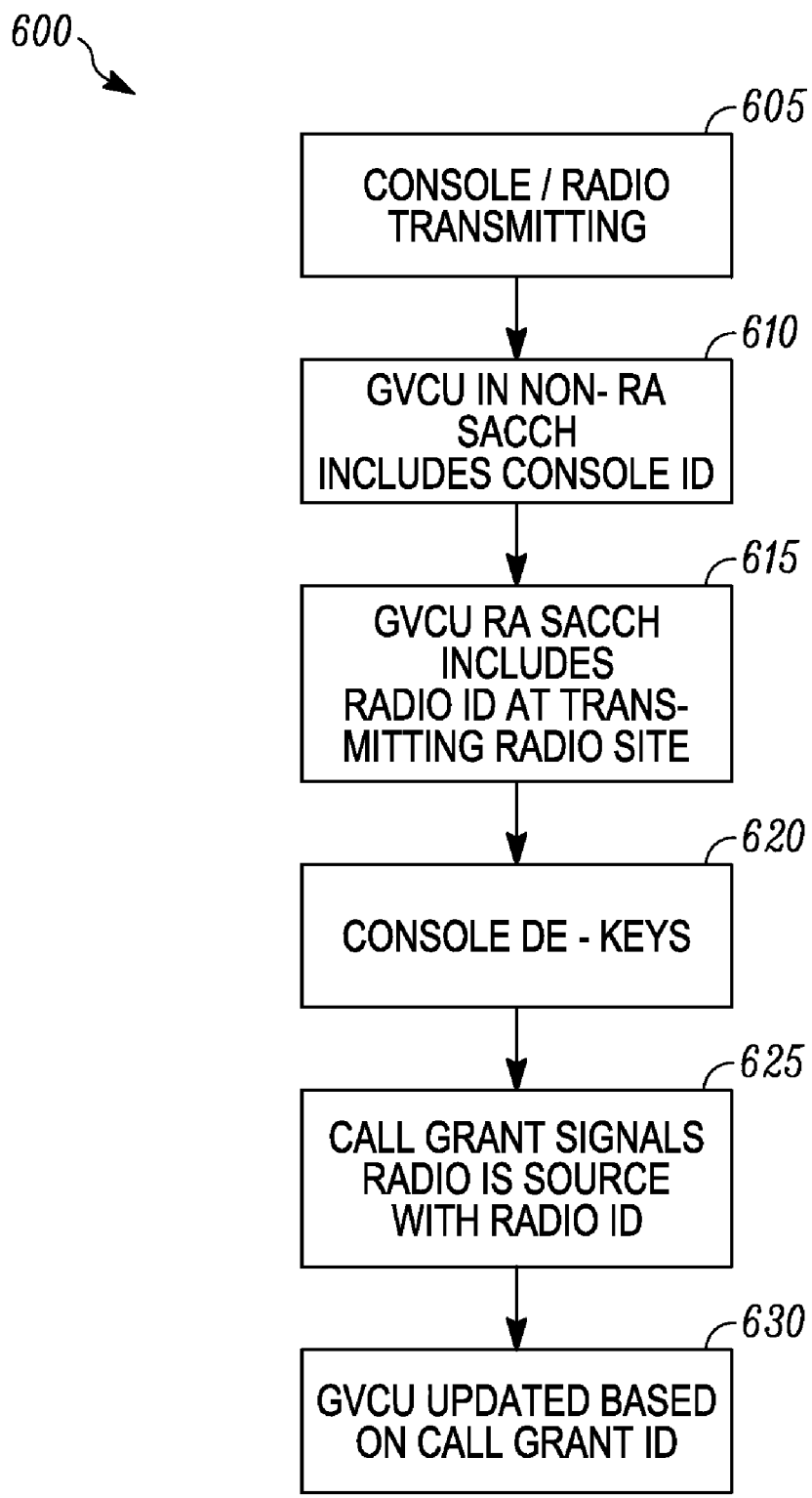
FIG. 6 is a flowchart illustrating a method for radio resumption in accordance with some embodiments.

FIG. 6 is a flowchart illustrating a method for radio resumption 600 in accordance with some embodiments. As illustrated, the operation begins with Step 605 in which a console and a radio are both transmitting. As shown in Step 610, each non-RA SACCH includes the console ID in the GVCU in the SACCH; and as shown in step 615, each RA SACCH includes the radio ID in the GVCU in the RA SACCH at the transmitting radio site. When the console dekeys in Step 620, the operation continues to Step 625 in which call grant signaling indicates the radio is the source of a call with the Radio ID. Next, in Step 630, GVCU messages are updated based on the call grant ID such that each GVCU in the non-RA SACCH and RA SACCH include the transmitting radio ID at the transmitting radio site (ID=0 at each destination site).

Figure 7:
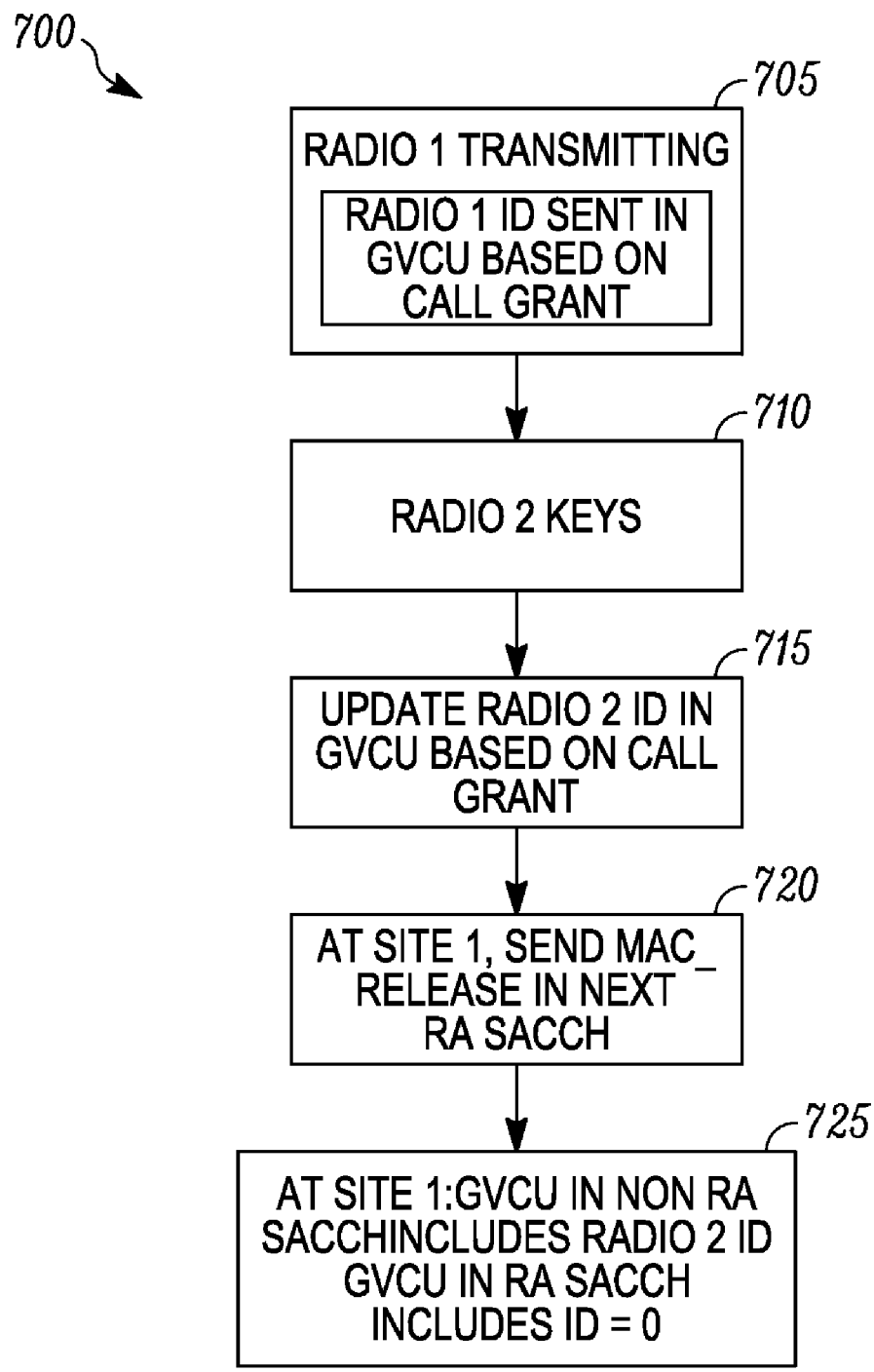
FIG. 7 is a flowchart illustrating a method of radio-to-radio audio interrupt at different sites in accordance with some embodiments.

FIG. 7 is a flowchart illustrating a method of radio-to-radio audio interrupt at different sites 700 in accordance with some embodiments. As illustrated, the operation begins in Step 705 in which, a site 1, Radio 1 is transmitting. It will be appreciated that, in accordance with the various operations described previously herein, Radio 1 ID is sent in GVCU messages in all FACCH/SACCHs based on the call grant. Next, in Step 710, Radio 2 keys. Next, in Step 715, after Radio 2 keys, the GVCU messages are updated to include Radio 2 ID based on call grant at site 2. Next, in Step 720, at site 1, a MAC_RELEASE is sent in the next available RA SACCH. Next, in Step 725, at site 1, the GVCU in each non-RA SACCH includes Radio 2 ID, and the GVCU in each RA SACCH includes ID=0.

Figure 8:
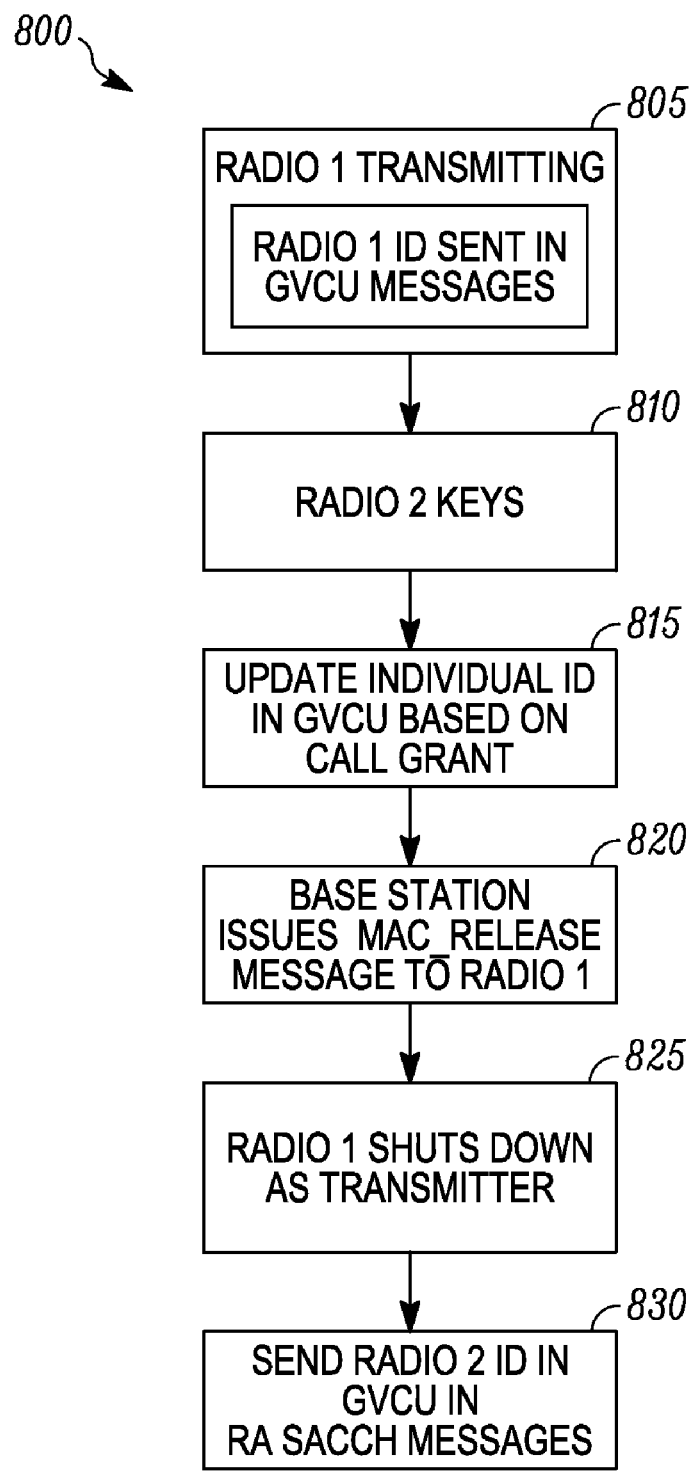
FIG. 8 is a flowchart illustrating a method of radio-to-radio audio interrupt at a same site in accordance with some embodiments.

FIG. 8 is a flowchart illustrating a method of radio-to-radio audio interrupt at a same site 800 in accordance with some embodiments. As illustrated, the operation begins with Step 805 in which Radio 1 is transmitting. It will be appreciated that Radio 1's ID is transmitted in GVCU messages in all FACCH/SACCHs based on the call grant. Next, in Step 810, Radio 2 keys. For example, Radio 2 can key on the control channel. Next, in Step 815, the Individual ID in GVCU messages is updated based on the Call Grant. Next, in Step 820, the BS issues a MAC_RELEASE message to Radio 1. In response, in step 825, Radio 1 shuts down its transmitter to prevent interfering with Radio 2. Next, in Step 830, Radio 2's ID is sent in the GVCU in the RA SACCH messages. In an alternative embodiment (not shown, the MAC_RELEASE and GVCU could be sent with Radio 2 ID in the same RA SACCH.

As will be appreciated by those of ordinary skill in the art, in any of the previously described scenarios, when the last radio has dekeyed on a call, MAC_HANGTIME Protocol Data Units (PDUs) are sent in FACCH and SACCH. The non-RA SACCH continues to signal call controller ID, and RA SACCH indicates ID=0.

Figure 9:
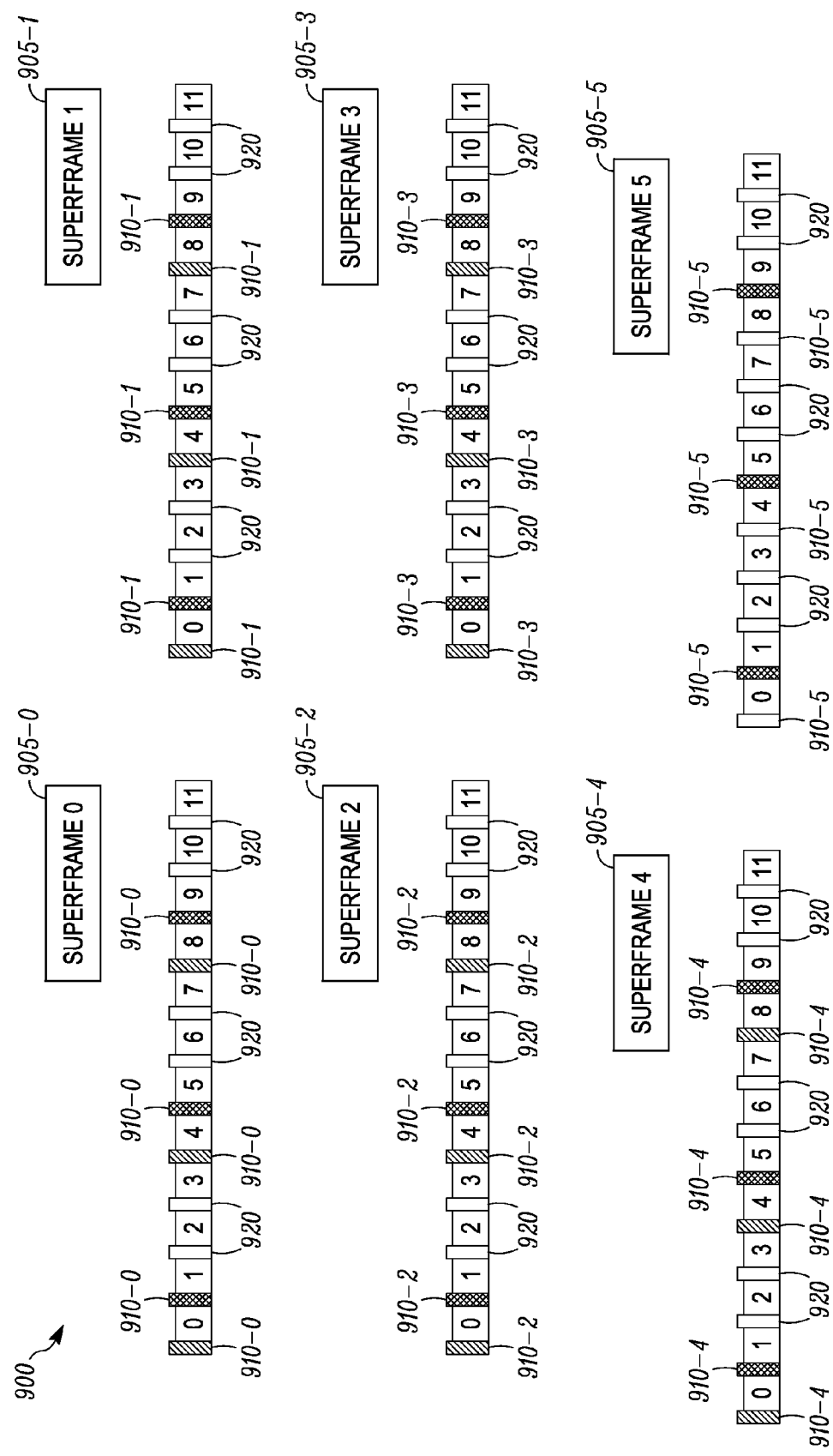
FIG. 9 illustrates voice channel random access control signaling in accordance with some embodiments.

FIG. 9 illustrates voice channel random access control signaling 900 in accordance with some embodiments. As illustrated, a plurality of superframes 905-$n$ provide signaling information within a voice channel. As mentioned previously herein, each superframe 905-$n$ contains 12 slots. The first 10 slots in each superframe, numbered 0 to 9, can be used for voice or signaling information. If they are used for signaling they are called the Fast Associated Control Channel (FACCH). The last 2 slots in each superframe, numbered 10 and 11, can only be used for signaling information, and they are called the Slow Associated Control Channel, or SACCH. A VCH is composed of 5 traffic (Voice+signaling) or FACCH timeslots followed by a SACCH signaling timeslot.

Inter-slot Signaling Channels (ISCH) alternate within each superframe 905-$n$. For example, two I-ISCH (910 and 915) alternate with two S-ISCH (920) in between each slot of each superframe 905.

Each I-ISCH has the format:

| 6 | 5 | 4 | 3 | 2 | 1 | 0 |
|---|---|---|---|---|---|---|
| Channel No | | ISCH Loc | | F | U/F Count | |

The channel number (Channel No) sub-field gives the parity of the VCH channel on the physical channel (note: If a number is preceded by a %, the number is to be interpreted as a binary number.):
  %00: VCH Channel 0,
  %01: VCH Channel 1,
  %10: Reserved value for use with four slot TDMA
  %11: Reserved value for use with four slot TDMA The ISCH sequence location (ISCH Loc) sub-field gives the location of the ISCH sequence on the superframe:
  %00: First I-ISCH sequence of the superframe,
  %01: Second I-ISCH sequence of the superframe,
  %10: Third I-ISCH sequence of the superframe,
  %11: Reserved.

The ultraframe count (U/F Count) sub-field is a counter gives the location of the current superframe within the ultraframe:
  %00: the current superframe is the 1st superframe in the ultraframe,
  %01: the current superframe is the 2nd superframe in the ultraframe,
  %10: the current superframe is the 3rd superframe in the ultraframe,
  %11: the current superframe is the last superframe in the ultraframe.

The F sub-field gives an indication to the SU(s) that listen(s) to the outbound path of the VCH whether or not the next inbound SACCH timeslot is free for an access:
  0: The next inbound SACCH timeslot is for talker access,
  1: The next inbound SACCH timeslot is for receiver access.

When the channel is idle (hangtime or not assigned), the FNE determines whether listening radios are allowed to use the inbound SACCH by the appropriate setting of the F sub-field.

In each superframe 905-$n$, I-ISCH 910-$n$ occurs before slot 0, between slots 0 and 1, between slots 3 and 4, between slots 4 and 5, between slots 7 and 8, and between slots 8 and 9. I-ISCH 910-$n$ provides information regarding whether Random Access is allowed or not in the F bits, and provides information regarding where the SACCH should be used as a Random Access SACCH or a non-Random Access SACCH. For example:

I-ISCH 910-0 in superframe 0 sets the counter to "00" indicating that bursts 10 and 11 in superframe 0 are used for Non-Random Access SACCH control.

I-ISCH 910-1 in superframe 1 sets the counter to "01" indicating that bursts 10 and 11 in superframe 1 are used for Non-Random Access SACCH control.

I-ISCH 910-2 in superframe 2 sets the counter to "10" indicating that bursts 10 and 11 in superframe 2 are used for Non-Random Access SACCH control.

I-ISCH 910-3 in superframe 3 sets the counter to "11" indicating that bursts 10 and 11 in superframe 3 used for Random Access SACCH control.

I-ISCH 910-4 in superframe 4 sets the counter to "00" indicating that bursts 10 and 11 in superframe 4 are used for Non-Random Access SACCH control.

I-ISCH 910-5 in superframe 5 sets the counter to "01" indicating that bursts 10 and 11 in superframe 5 are used for Non-Random Access SACCH control.

As described herein, embodiments are provided for the FNE to accurately know when a transmitting radio will be transmitting in the SACCH and when it is not so it can use this knowledge to determine synchronization for the transmitting radio as well as appropriately apply received control messages from the radio. The FNE can know also the outbound SACCH pattern to effectively signal both the overall call owner's ID as well as the allowed transmitting radio ID. This allows receiving radios to obtain caller ID information and controls the radio that is allowed to transmit on the inbound channel. Further, embodiments are provided for the transmitting radio to learn the SACCH pattern from either the control channel or the ISCH signaling pattern prior to starting to transmit. Once this is known, the radio will follow this pattern for the length of the transmission/call. The transmitting radio will also be able to verify that it is still allowed to transmit by looking at the ¼ SACCH signaling. Further, embodiments are provided for the receiving radios to obtain the SACCH pattern from the control channel and from the I-ISCH. Once this is known, the receiving radios can affectively determine caller ID information.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of providing control signaling to a group of wireless communication devices communicating on a voice channel, the method comprising:
   operating at least one fixed network equipment to:
      determine a patterned ordering of dedicated signaling timeslots including an ordering position of a first set of non-random access dedicated signaling timeslots and an ordering position of a second set of random access dedicated signaling timeslots within the voice channel; and
      signal the patterned ordering of dedicated signaling timeslots to one or more wireless communication devices communicating on the voice channel via a message transmitted outside of the dedicated signaling timeslots.

2. The method as recited in claim 1, wherein the voice channel operates using an Association of Public-Safety Communications Officials (APCO) Project 25 (P25) Media Access Control (MAC) standard, and wherein the message comprises at least one of a control channel Sync Broadcast message and information in an Information Inter-slot Signaling CHannel (I-ISCH).

3. The method as recited in claim 1, wherein the information received in the message comprises at least one of a one of four timeslot pattern and a three of four timeslot pattern.

4. The method as recited in claim 1, wherein:
   the first set of the timeslots comprise Non-Random Access (Non-RA) Slow Associated Control Channel (SACCH) signaling, and
   the second set of the timeslots comprise Random Access (RA) SACCH signaling.

5. The method as recited in claim 4, wherein:
   the first set of timeslots further comprise a three of four SACCH signaling timeslot pattern; and
   the second set of timeslots further comprise a one of four SACCH signaling timeslot pattern.

6. The method as recited in claim 5, further comprising:
   operating a first one of the wireless communication devices communicating on the voice channel to determine a one of four Random Access SACCH pattern from a Sync Broadcast message received on a Control Channel when the first one of the wireless communication devices is a synchronized wireless communication device; and
   operating the first one of the wireless communication devices communicating on the voice channel to determine a one of four Random Access SACCH pattern from an I-ISCH when the first one of the wireless communication devices is an unsynchronized wireless communication device.

7. The method as recited in claim 5, further comprising:
   operating a first one of the wireless communication devices communicating on the voice channel to determine a three of four Non-Random Access SACCH pattern from a Sync Broadcast message received on a Control Channel when the first one of the wireless communication devices is a synchronized wireless communication device; and
   operating the first one of the wireless communication devices communicating on the voice channel to determine a three of four Non-Random Access SACCH pattern from an I-ISCH when the first one of the wireless communication devices is an unsynchronized wireless communication device.

8. The method as recited in claim 1, wherein the patterned ordering of dedicated signaling timeslots is signaled at least one of prior to and during an active call.

9. The method as recited in claim 1, further comprising:
   transmitting a group voice channel user signal from a transmitting wireless communication device at a source site to a group of wireless communication devices at a destination site;
   transmitting, at the destination site, a radio identification (ID) of the transmitting wireless communication device within a first set of timeslots of the group voice channel user signal in accordance with the patterned ordering indicated in the message, and transmitting an ID of zero within the second set of timeslots of the group voice channel user-signal in accordance with the patterned ordering indicated in the message; and
   transmitting, at the source site, the radio ID of the transmitting wireless communication device within the first set of timeslots and the second set of timeslots of the group voice channel user signal.

10. The method as recited in claim 9, wherein:
    the first set of timeslots comprise three of four non-random access (Non-RA) slow associated control channel (SACCH) signaling timeslots; and
    the second set of timeslots comprise one of four random access (RA) SACCH signaling timeslots.

11. The method as recited in claim 9, further comprising:
    setting the radio ID to zero in the second set of timeslots at the source site when the transmitting wireless communication device dekeys.

12. The method as recited in claim 9, further comprising prior to transmitting the group voice channel user signal from the transmitting wireless communication device:
    the fixed network equipment providing a Call Grant to the transmitting wireless communication device; and
    the fixed network equipment setting the radio ID to the radio ID of the transmitting wireless communication device of the Call Grant for group voice channel user signaling.

13. The method as recited in claim 11, further comprising:
    keying a console to transmit on the voice channel; and
    transmitting a console ID of the console within the first set of timeslots of the group voice channel user signal, and transmitting an ID of zero within the second set of timeslots of the group voice channel user signal.

14. The method as recited in claim 13, further comprising prior to keying the console:
    setting the radio ID to zero in the group voice channel user signal in one or more second sets of timeslots at each of a plurality of destination sites.

15. The method as recited in claim 14, wherein the second sets of timeslots comprise random access (RA) slow associated control channel (SACCH) signaling timeslots.

16. The method as recited in claim 13, further comprising:
    keying a second one of the wireless communication devices on the voice channel; and
    transmitting a radio ID of the second one of the wireless communication devices within the first set of timeslots of the group voice channel user signal, and transmitting an ID of zero within the second set of timeslots of the group voice channel user signal at the source site.

17. The method as recited in claim 9, further comprising:
    indicating that a console is transmitting in a take over Call Grant; and populating each of a plurality of group voice channel user messages with a console ID from the take over Call Grant in the first set of timeslots at a source and a destination site.

18. The method as recited in claim 17, further comprising:
continuing to transmit the radio ID of the transmitting wireless communication device in the group voice channel user at the source site in the second set of timeslots.

19. The method as recited in claim 9, further comprising:
keying another wireless communication device on the voice channel;
updating a plurality of group voice channel user messages to include an ID of the another wireless communication device at a site of the another wireless communication device;
sending a MAC_Release message in the next available timeslot; and
updating the first set of timeslots of the group voice channel user signal to include the ID of the another wireless communication device, and a radio ID of zero within the second set of timeslots of the group voice channel user signal at the associated site of a previously transmitting wireless communication device.

20. The method as recited in claim 9, further comprising:
keying another wireless communication device on the voice channel at a same site as the transmitting wireless communication device;
updating a plurality of GVCU messages to include an ID of the another wireless communication device;
sending a MAC_Release message by a base station to the transmitting wireless communication device; and
updating the first set of timeslots and the second set of timeslots of the group voice channel user signal to include the ID of the another wireless communication device.

21. The method as recited in claim 9, further comprising:
dekeying the transmitting wireless communication device in response to receiving a radio ID of another wireless communication device in the second set of timeslots.

* * * * *

UNITED STATES PATENT AND TRADEMARK OFFICE
CERTIFICATE OF CORRECTION

PATENT NO. : 8,243,750 B2  
APPLICATION NO. : 12/609660  
DATED : August 14, 2012  
INVENTOR(S) : McDonald et al.

Page 1 of 1

It is certified that error appears in the above-identified patent and that said Letters Patent is hereby corrected as shown below:

On the Title Page, in item (75), under "Inventors", in Column 1, Line 2, delete "Steamwood," and insert -- Streamwood, --, therefor.

In Fig. 4, Sheet 4 of 9, for Tag "410", in Line 1, delete "SACHH'S" and insert -- SACCH'S --, therefor.

In Fig. 7, Sheet 7 of 9, for Tag "725", in Line 2, delete "SACCHINCLUDES" and insert -- SACCH INCLUDES --, therefor.

In Column 6, Line 15, delete "though" and insert -- through --, therefor.

Signed and Sealed this  
Twenty-second Day of January, 2013

David J. Kappos  
*Director of the United States Patent and Trademark Office*